C. W. BOMAN.
BORING APPARATUS.
APPLICATION FILED MAY 15, 1917.
1,286,515.
Patented Dec. 3, 1918.
2 SHEETS—SHEET 1.
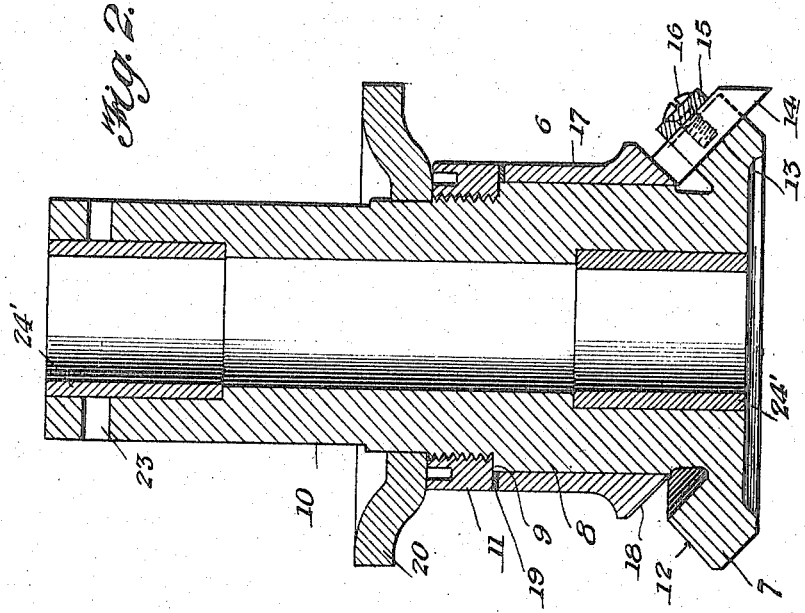
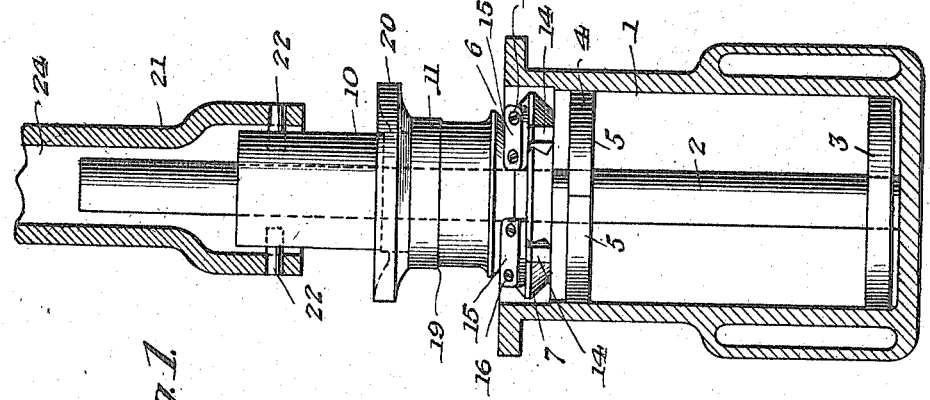
WITNESSES
R. J. Hoge
R. F. Miehl, Jr.
INVENTOR
C. W. Boman
BY Victor J. Evans
ATTORNEY

UNITED STATES PATENT OFFICE.

CARL W. BOMAN, OF MEDFORD, MASSACHUSETTS.

BORING APPARATUS.

1,286,515. Specification of Letters Patent. Patented Dec. 3, 1918.

Application filed May 15, 1917. Serial No. 168,729.

*To all whom it may concern:*

Be it known that I, CARL W. BOMAN, a citizen of the United States, residing at Medford, in the county of Middlesex and State of Massachusetts, have invented new and useful Improvements in Boring Apparatus, of which the following is a specification.

My invention relates to boring apparatus and has for its objects to provide a boring apparatus for boring cylinders having one end thereof closed.

The invention is particularly adapted for reboring cylinders of internal combustion motors which have become scarred or scratched in service.

Another object of my invention is to provide a boring head having adjustable cutters mounted thereon and adjusting means therefor whereby the cutters may be readily adjusted to bore different sizes of holes.

With these and other objects in view which will be hereinafter fully described and particularly pointed out in the claim, the invention consists in the novel construction and arrangement of parts illustrated in the accompanying drawings forming a part of this specification, in which:—

Figure 3:
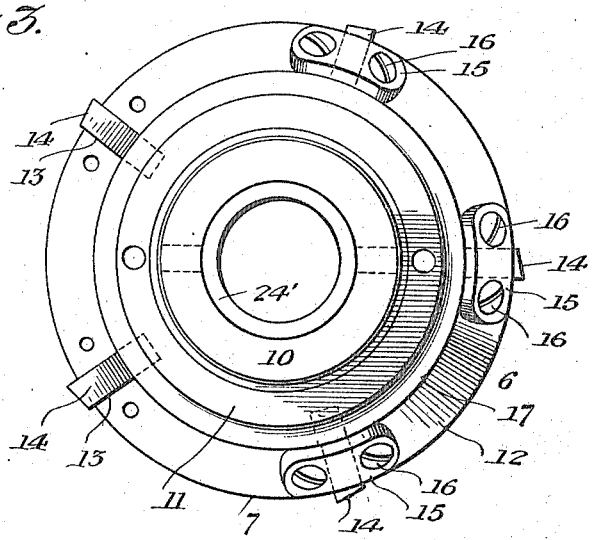
Figure 4:
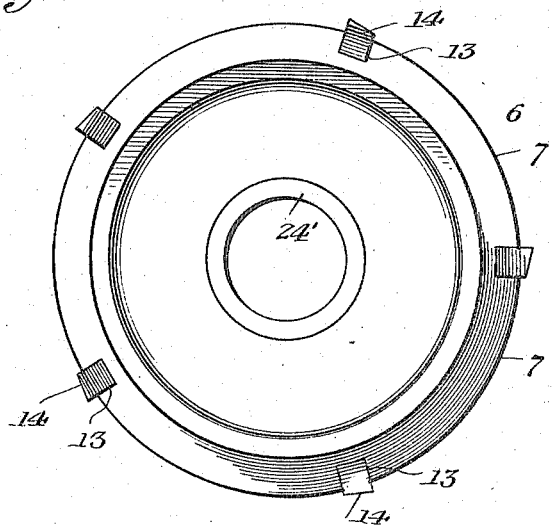

Figure 1 is a vertical section through a cylinder to which a boring apparatus embodying my invention is applied, Fig. 2 is a vertical section of the boring apparatus, Fig. 3 is a bottom plan view of the boring apparatus, Fig. 4 is a top plan view of the boring head.

Like characters of reference indicate like parts in the various views.

In the drawings 1 designates a cylinder of an internal combustion motor which is to be re-bored. 2 designates a stationary arbor. A centering guide 3 is mounted upon the front end of the arbor and fits the original bore of the cylinder 1 rather closely to center the front end of the arbor therewithin. 4 designates a removable centering guide formed in two sections 5. The centering guide 4 is disposed near the open end of the cylinder when the boring operation is started so that the cut of the boring head will be started concentric with the original bore of the cylinder. After the cut is started the centering guide 4 may be removed, this being an easy operation due to the fact that the guide is composed of two sections.

6 designates a boring head which is mounted on the arbor 2 for rotation and for longitudinal movement. The boring head has a flange 7 formed at its front end, a large cylindrical portion 8 immediately in back of said flange and terminating in a rearwardly facing shoulder 9, and a smaller cylindrical portion 10 extending from said shoulder to the rear end of the head. That portion of the surface 10 which lies immediately adjacent the shoulder 9 is slightly enlarged and is screw threaded, and a nut 11 is screw threaded thereon and abuts the shoulder 9, said nut being of greater diameter than the enlarged cylindrical portion 8. The flange 7 has a rearwardly facing frusto-conical surface 12 formed thereon, which is provided with a series of elementally disposed slots 13. Cutters 14 engage respective slots 13 and are secured within said slots by means of clamping plates 15 extending across the opening of the slots and secured upon the flange by means of headed screws 16 engaging holes at the ends of each clamping plate and screw threaded holes in the flange. A sleeve 17 is mounted for longitudinal movement upon the enlarged cylindrical portion 8 and has an upwardly facing frusto-conical surface 18 formed thereon abutting the rear ends of the cutters 14 whereby the position of the cutters may be regulated by inserting shims 19 of various thicknesses between the rear surface of the sleeve and the front surface of the nut 11. This adjustment mechanism, it will be noted, is very positive in its operation and will position each cutter exactly the same distance relative to the axis of the boring head when a shim is placed between said sleeve and nut. In adjusting the cutters the clamping plates 15 are loosened slightly and the nut 11 removed from the boring head. A shim 19 of the proper thickness is placed upon the rear face of the sleeve and the nut is then screwed down against the shoulder 9. This moves the sleeve the thickness of the shim and the motion of the sleeve is transmitted to the cutters to adjust them outwardly. It is of course necessary when the cutters are first inserted into the boring head that they all be of a uniform length. This is obtained by inserting the cutters into the head with their rear ends abutting the sleeve and the sleeve abutting the nut, and grinding the cutting edges of the cutter upon an automatic grinding machine, as is the usual practice in the preparation of inserted tooth cutters for use.

A follow guide 20 is provided having a hole therein adapted to closely engage the cylindrical surface 10. The outer diameter of the follow guide 20 is of such a size that it will engage the surface of the re-bored portion of the cylinder as the boring head is moved downwardly therein to guide the boring head centrally and to prevent the cutters from running out of center due to irregularities in the cylinder surface. A hollow driving sleeve 21 loosely encircles the arbor 2 and has driving pins 22 mounted upon the front end thereof, which engage holes 23 at the rear end of the boring head. The rear end of the driving sleeve 21 is attached to the spindle 24 of a drill press or boring machine and the boring head is driven and fed thereby. The sleeve 21 is of such length that it will drive the boring head to the bottom of the cylinder without interfering with the arbor 2. Thus the arbor 2 is independent of the driving sleeve and is not subject to the various strains passing therefrom and will guide the boring head centrally of the cylinder even though there be an irregular driving and feeding strain exerted upon the boring head. The boring head is provided with hardened bushings 24' which engage the arbor and are snugly fitted thereto to properly guide the boring head. It is not necessary to describe in detail the construction and operation of the drill press or boring machine in the disclosure of my invention, and it is sufficient to say that the driving sleeve is rotated and fed slowly to revolve the boring head and feed it longitudinally along the arbor 2.

Having thus fully described my invention, I claim:—

In a device of the character described, the combination with an arbor, of a boring head mounted thereon for rotation and for longitudinal movement, a centering guide mounted on the front end of said arbor and adapted to engage the bore of a cylinder to hold the arbor stationary, of a removable centering guide adapted to center the rear end of the arbor with the bore of the cylinder as the boring operation is started, cutters mounted on said head, a follower guide mounted on said head at the rear of said cutters, and a hollow driving sleeve encircling said arbor and having driving connection with said boring head.

In testimony whereof I affix my signature.

CARL W. BOMAN.

Copies of this patent may be obtained for five cents each, by addressing the "Commissioner of Patents, Washington, D. C."